G. G. LARKIN.
Carriage Circle Coupling.
No. 3,105. Reissued Sept. 1, 1868.
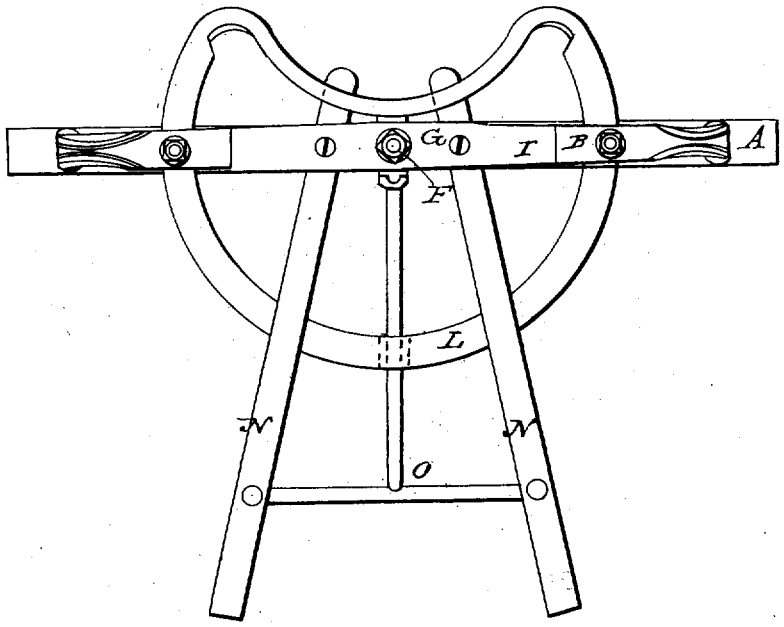
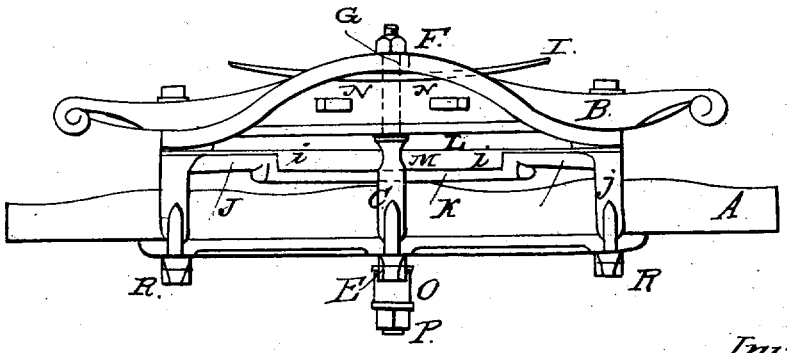
Witnesses
A Goodwin
Frederic Sargent
Inventor
George G. Larkin
N. PETERS, Photo-Lithographer, Washington, D. C.

United States Patent Office.

GEORGE G. LARKIN, OF WEST AMESBURY, MASSACHUSETTS.

*Letters Patent No.* 42,199, *dated April* 5, 1864; *reissue No.* 3,105, *dated September* 1, 1868.

IMPROVEMENT IN CARRIAGE-CIRCLE COUPLING.

The Schedule referred to in these Letters Patent and making part of the same.

TO ALL WHOM IT MAY CONCERN:

Be it known that I, GEORGE G. LARKIN, of West Amesbury, in the county of Essex, and State of Massachusetts, have invented a new and useful Improvement in Carriage-Circle Couplings; and I do hereby declare that the following is a full, clear, and exact description of the construction and operation of the same, reference being had to the accompanying drawings, forming a part of this specification, in which—

Figure 1 is a top view, and

Figure 2 is a front view.

Like parts are indicated by the same letters in both drawings.

My invention relates to what are known as "circle-couplings," and consists in so constructing and combining the two circles as to avoid the rattling contact of a portion of their rear parts, and further, in providing the upper circle with a stop to operate in combination with jogs or shoulders, formed by sinking the back part of the lower circle, as hereinafter described, so that in turning a carriage, said stop and jogs shall prevent the front wheels from striking and grinding on "gall-irons," or the sides of the carriage, whereby the latter is often upset or lifted so as to break the springs.

To enable others skilled in the art to make and use my improvement, I will now proceed to describe its construction and operation.

A is the wooden axle-tree, to which the iron axle is attached in the usual manner.

B is the "head-block," to which are confined, by bolts and screws, the spring-seat I and upper circle L, and through which are also passed the front ends of the perches N N.

C is the "king-bolt," the lower part of which clasps the axle A, being confined by means of nuts E, as shown in fig. 2, while the upper part, passing through the head-block B, is provided with a screw and a nut, F, which rests upon a rubber washer, G, by means of which devices the upper circle is always pressed sufficiently hard upon the under.

O is a brace, running from the perches to the bottom of the "king-bolt" or screw P.

The under circle is attached to the axle A in the usual manner, the clamps *j j* being a continuation of the circle, and provided at their lower ends with screws and nuts R R, as represented in fig. 2. This under circle (see fig. 2) consists of two side arcs J J and a central arc, K, the latter being depressed to avoid contact against the corresponding portion of the upper circle L, and so as to form two jogs or shoulders *i i*, against which, in turning the carriage, the stop M of the upper circle may strike and bear for the purposes described above.

My coupling can be made about or quite as cheaply as any circle-coupling in use, and obviously constitutes a great improvement over them.

Having thus described the construction and operation of my invention, what I claim as new, and desire to secure by Letters Patent, is—

1. The lower circle J J K, formed with a depressed rear portion, in combination with an upper circle, L, constructed and applied, substantially as herein set forth.

2. In combination with the lower circle J J K and upper circle L, thus constructed and combined, I further claim the stop M, for the purpose specified.

GEORGE G. LARKIN.

Witnesses:

WILLIAM H. CURRIER,

DAVID B. PAGE.